United States Patent Office 3,547,684
Patented Dec. 15, 1970

3,547,684
PROCESS FOR MAKING ORGANIC POLYMER FILLED GAS CHROMATOGRAPHIC COLUMNS
Oscar Le Roy Hollis and Robert D. Acuff, Lake Jackson, Tex., assignors to The Dow Chemical Company, Midland, Mich., a corporation of Delaware
No Drawing. Filed Oct. 17, 1968, Ser. No. 768,511
Int. Cl. B05c 8/00, 8/02
U.S. Cl. 117—95    3 Claims

ABSTRACT OF THE DISCLOSURE

A process for preparing gas chromatographic columns of synthetic organic polymers which consist in (1) depositing upon internal surfaces of an elongated conduit a liquid mixture of at least one polymerizable unsaturated monomer and an inert non-polar hydrocarbon solvent together with a polymerization initiation catalyst and (2) polymerizing said monomer to define a polymer-walled path for a stream of gas through said conduit.

---

This invention concerns a process for making gas chromatographic columns the internal walls of which are coated with insoluble cross-linked microporous polymer. It pertains especially to a method of polymerizing the said polymer upon the walls of an elongated conduit or tube.

In the carrying out of chromatographic separations it is common practice to contact vapors or a mixture of vapors and a carrier gas as with an absorbent or bed of solid material contained in an elongated conduit, tube or column. It is oftentimes difficult and time-consuming to fill small diameter tubes or columns, with a finely divided insoluble polymer so as to be free or substantially free of voids and to have substantially uniform density of the bed of polymer throughout the coil, tube or conduit.

One way of overcoming this difficulty is described in U.S. Pat. 2,920,479 issued to M. J. E. Golay in which a small diameter tube is internally coated with an absorbent material suitable for gas chromatography.

It has now been found that insoluble, cross-linked microporous organic polymers can readily be deposited or formed in elongated conduits so as to form a bed of said polymer having substantially uniform porosity by a process which comprises (1) depositing upon internal surfaces of an elongated conduit a liquid mixture comprising at least 20 percent by weight of a divinyl monomer e.g. a divinyl aromatic hydrocarbon monomer, together with an inert organic solvent for the monomer that is a poor solvent for the polymer and has the relationship $\delta = \delta_0 \pm 0.8$ wherein $\delta$ is the solubility parameter for the solvent and $\delta_0$ is the solubility parameter for the polymer (see U.S. 3,322,695) and (2) polymerizing said monomer within said conduit and in admixture with said solvent or solvent mixture so as to leave a polymer-walled path for the flow of a stream of gas through the conduit.

The polymerizable divinyl monomer can be a divinyl aromatic hydrocarbon such as divinyl benzene, divinyl toluene, divinyl xylene or a mixture of at least 20 percent by weight of at least one such divinyl aromatic hydrocarbon or ethylene glycol dimethacrylate and one or more monovinyl aromatic hydrocarbons such as styrene, ethylvinylbenzene, isopropylstyrene, vinyltoluene, vinylxylene, and diethylvinylbenzene. Mixtures of any two or more of such monomers can be used.

Such monomers or mixtures of monomers when polymerized in admixture with from about 0.5 to about 20 times their weight of a solvent that is miscible with the monomer but exhibits or has a limited solubility for the polymer results in the formation of rigid, insoluble, microporous polymers having a plurality of interconnecting pores therein and a surface area of 50 square meters or more per gram of the polymer.

The solvent for the monomer must be non-polymerizable with the monomers, and only swell, but not dissolve the polymer. The sizes of the pores in the polymer and its density are dependent in part upon the kind of solvent employed, e.g. whether an aromatic hydrocarbon such as toluene, ethylbenzene, diethylbenzene, isopropylbenzene, or an aliphatic compound such as heptane, octane, nonane, or decane, or a mixture of aromatic and aliphatic hydrocarbons is used.

The method of depositing upon the walls of the elongated conduit, tube, or column, with the insoluble, cross-linked microporous polymer is to deposit upon internal surfaces of said conduit a liquid mixture of monomer(s) and in inert liquid organic hydrocarbon solvent preferably boiling at temperatures above 100° C. at 760 millimeters absolute pressure, and polymerizing said monomer(s) in admixture with said solvent within said conduit. The polymerization is carried out in mass, i.e. in the liquid state, at temperatures between about 50° and 130° C. and at atmospheric, subatmospheric or superatmospheric pressure, preferably atmospheric pressure or thereabout, so as to leave a polymer-walled path for the flow of a stream of gas along the axis of said conduit and into contact with and through the micropores of said polymer.

It is important in depositing the polymerizable mixture on the internal walls of the tube, or column, to see that the proper ratio of monomer mixture to diluent solvent is maintained. This is accomplished by employing a gas stream saturated with the solvent used as diluent for forcing out excess liquid from the tube. This leaves the polymerizable monomers and diluent coating only the walls, thus leaving a free path along the axis of the tube for the free flow of gas.

The following examples illustrate the ways in which the principle of the invention has been applied, but are not to be construed as limiting its scope.

EXAMPLE 1

A 1/16 inch outside diameter stainless steel tube 100 feet long and in the form of a horizontal coil was washed and was flushed with pentane until the interior surface was dry. One end of the coil was attached to a 1/4 inch outside diameter stainless steel tube 4 inches long. The other end of the 1/4 inch tube was connected by 1/8 inch stainless steel tubing to one end of a second 1/4 inch stainless steel tube 4 inches long and filled with particles of a microporous insoluble cross-linked divinylbenzene polymer, which polymer was saturated with diethylbenzene. A polymerizable monomer mixture was prepared, consisting of 20 grams of diethylbenzene as solvent, 30 grams of commercial divinylbenzene (a mixture of about 55 percent by weight divinylbenzene and 45 percent ethylvinyl benzene) and 0.3 gram of $\alpha,\alpha$-azobisisobutyronitrile as a catalyst. A charge of 5 ml. of the monomer mixture was introduced into the 1/4 inch tube directly connected to the 1/16 inch diameter tubular coil. Helium was passed through the second 1/4 inch diameter tube containing the porous polymer saturated with diethylbenzene so that the stream of helium was saturated with diethylbenzene vapors and was passed via the 1/8 inch tube through the first 1/4 inch tube to carry the monomer mixture therein into the 1/16 inch diameter tubular coil. Excess liquid was forced out of the 1/16 inch diameter tubular coil by means of the saturated helium gas. The coil was immersed in a water bath at 50° C. for 1.5 hours. The temperature was raised to 60° and the coil heated for 1.5 hours longer. Finally, the coil was heated in the water bath at 70° C. for 48 hours to complete the polymerization. The flow of saturated helium was maintained throughout the polymerization reaction.

EXAMPLE 2

A section of the 1/16 inch diameter tubular coil 25 feet long and containing the polymer was flushed with methyl alcohol to remove solvent therein then was dried and tested in a chromatographic separation of hydrocarbons at room temperature and at 50° C. using helium as the carrier gas. A sample of the mixed hydrocarbons was injected into the stream of helium flowing at a rate of about 2.5 milliliters per minute through the bed of polymer in the coil. The order and the time of elution of the individual hydrocarbons in the effluent gas were as follows:

| Hydrocarbon | Elution time min. | |
|---|---|---|
| | Room, ° C. | 50° C. |
| Methane | 0.60 | 0.53 |
| Ethylene | 0.82 | 0.67 |
| Ethane | 1.00 | 0.74 |
| Propylene | 3.22 | 1.58 |
| Propane | 3.80 | 1.79 |
| Propadiene | 4.00 | 1.87 |
| Methyl acetylene | 4.35 | 1.95 |
| Butadiene | | 6.73 |

EXAMPLE 3

The tubular coil used in Example 2 was employed to separate a mixture of aliphatic hydrocarbons having from 1 to 6 carbon atoms in the molecule. The separation was carried out at 120° C. The order and the time of elution of the hydrocarbons were as follows:

| Hydrocarbon Number of C atoms: | Elution time at 120° C. min. |
|---|---|
| 1–3 | 1 |
| 4 | 1–1.5 |
| 5 | 2–3 |
| 6 | 4–6.5 |

We claim:

1. The method of preparing a column suitable for vapor chromatography which comprises:
    (1) filling a tube with a polymerizable mixture comprising at least one polymerizable diunsaturated monomer, a diluent which is a solvent, or mixture of solvents, which is inert to the reaction, and a polymerization initiating catalyst;
    (2) flushing said polymerizable mixture from said tube with an inert gas saturated with said diluent thereby leaving a coating of said polymerizable mixture on the walls thereof;
    (3) subjecting said tube to a heating step, while maintaining the flow of inert saturated gas therethrough, to polymerize said monomer thereby forming a coating of an insoluble, crosslinked microporous polymer on the walls thereof.

2. A process for making a gas chromatographic column comprising an elongated conduit containing an insoluble cross-linked microporous organic polymer adhered in part to the internal surface of said conduit, which process comprises
    (1) depositing upon the internal surface of said conduit a liquid mixture of a divinyl monomer and an inert organic solvent and
    (2) polymerizing the divinyl monomer in admixture with the organic solvent within said conduit so as to leave a polymer-walled path for the flow of a stream of gas through the conduit.

3. A process as claimed in claim 2 wherein the liquid mixture is a mixture of a predominant amount by weight of divinyl benzene and a minor amount of ethylvinylbenzene.

References Cited

UNITED STATES PATENTS

| 2,920,478 | 11/1960 | Golay | 73—23.1 |
| 3,295,296 | 11/1967 | Halasz et al. | 55—67 |
| 3,357,158 | 12/1967 | Hollis | 55—67 |
| 3,387,710 | 6/1968 | Pogacar | 55—197X |

ALFRED L. LEAVITT, Primary Examiner

E. G. WHITBY, Assistant Examiner

U.S. Cl. X.R.

55—67; 73—23.1

PO-1050
(5/69)

UNITED STATES PATENT OFFICE
CERTIFICATE OF CORRECTION

Patent No. 3,547,684            Dated    15 December 1970

Inventor(s) Oscar Le Roy Hollis and Robert D. Acuff

It is certified that error appears in the above-identified patent and that said Letters Patent are hereby corrected as shown below:

In column 1, line 40, change "2,920,479" to -- 2,920,478 --.

In column 3, line 11, change "2.5" to -- 45 -- .

Signed and sealed this 18th day of May 1971.

(SEAL)
Attest:

EDWARD M. FLETCHER, JR.           WILLIAM E. SCHUYLER, J
Attesting Officer                Commissioner of Patent